(12) United States Patent
Kahlon et al.

(10) Patent No.: US 6,380,701 B1
(45) Date of Patent: Apr. 30, 2002

(54) VEHICLE CHARGE ASSEMBLY

(75) Inventors: Gurinder Singh Kahlon, Canton; Ning Liu, Novi; Robert J. Mohan, Canton, all of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/540,325

(22) Filed: Mar. 31, 2000

(51) Int. Cl.[7] .............................. H02P 9/04; F02N 11/08
(52) U.S. Cl. ....................... 318/139; 318/140; 318/141; 290/40 C; 180/65.2
(58) Field of Search ................................. 318/140–159, 318/139, 138, 376, 801; 307/10 R, 66; 320/1; 322/17, 14, 16; 290/38 R, 31, 10, 40 C; 123/339.19, 179.21, 179.6; 180/65.2, 65.4, 197; 310/11

(56) References Cited

U.S. PATENT DOCUMENTS

| | | | | |
|---|---|---|---|---|
| 4,127,782 A | * | 11/1978 | Omura et al. | |
| 4,777,421 A | | 10/1988 | West | ........................... 318/768 |
| 5,041,776 A | * | 8/1991 | Shirata et al. | |
| 5,155,373 A | * | 10/1992 | Tsuchiya et al. | |
| 5,285,862 A | | 2/1994 | Furutani | ..................... 318/139 |
| 5,350,994 A | | 9/1994 | Kinoshita | ................... 320/116 |
| 5,513,718 A | * | 5/1996 | Suzuki et al. | |
| 5,552,681 A | * | 9/1996 | Suzuki et al. | |
| 5,589,743 A | * | 12/1996 | King | |
| 5,650,713 A | * | 7/1997 | Takeuchi et al. | |
| 5,705,859 A | | 1/1998 | Karg | ........................... 290/45 |
| 5,850,113 A | * | 12/1998 | Weimer et al. | |
| 5,923,104 A | * | 7/1999 | Haaland et al. | |
| 5,925,938 A | | 7/1999 | Tamor | ........................ 318/139 |
| 5,982,604 A | * | 11/1999 | Kojima et al. | |
| 6,075,331 A | * | 6/2000 | Ando et al. | |
| 6,109,229 A | * | 8/2000 | Pels | |
| 6,109,237 A | * | 8/2000 | Pels et al. | |
| 6,177,734 B1 | * | 1/2001 | Masberg et al. | |
| 6,199,650 B1 | * | 3/2001 | Masberg et al. | |
| 6,202,615 B1 | * | 3/2001 | Pels et al. | |
| 6,202,776 B1 | * | 3/2001 | Masberg et al. | |
| 6,205,379 B1 | * | 3/2001 | Morisawa et al. | |

\* cited by examiner

*Primary Examiner*—Paul Ip
(74) *Attorney, Agent, or Firm*—VisteonGlobal Tech., Inc.

(57) ABSTRACT

An electrical charge assembly 10 for use within a vehicle 12 having a transmission 20, a starter assembly 16, and an engine 14. The assembly 10 includes a capacitor assembly 34 which selectively provides electrical charge to the starter assembly 16, effective to allow the engine 14 to be activated. The starter 16 may be selectively coupled to the transmission 20, effective to increase the torque produced by the transmission 20 and may selectively provide electrical charge to the capacitor assembly 34.

12 Claims, 1 Drawing Sheet

VEHICLE CHARGE ASSEMBLY

FIELD OF THE INVENTION

This invention relates to a vehicle charge assembly and more particularly, to an assembly which selectively stores and provides electrical charge to a vehicle starter, effective to allow a vehicle engine to be started.

BACKGROUND OF THE INVENTION

Electric vehicles currently use relatively large and heavy battery assemblies to store and selectively provide electrical charge in order to activate/operate the transmission assembly or power train and to operate the various devices and components contained within these vehicles. Hybrid type vehicles use these battery assemblies in combination with an internal combustion engine. Particularly, these battery assemblies provide electrical charge to the vehicle starter, effective to activate or start the engine and selectively provide electrical power to the transmission assembly, effective to allow the vehicle to be driven without the use of the engine.

While these battery assemblies do store and provide electrical charge, they suffer from some drawbacks. Particularly, these battery assemblies are relatively heavy, thereby reducing the vehicle's fuel economy. These battery assemblies also utilize a chemical reaction which is relatively difficult to model or operationally predict, thereby preventing the creation of relatively accurate operating characteristics or operating models for these vehicles, such models being necessary to accurately predict overall vehicle operation.

Moreover, the electrical charge produced by these battery assemblies is highly susceptible to temperature variation and these batteries are relatively bulky, thereby requiring a relatively large amount of storage space. Due to the proliferation of many diverse types of vehicular components and assemblies and the relatively limited amount of vehicular storage space, it is highly desirable to reduce the size of the deployed components and assemblies and the concomitant need for such storage space. The use of these bulky batteries thereby undesirably reduces the amount of available storage space.

There is therefore a need for a new and improved vehicular charge assembly which overcomes at least some of the previously delineated drawbacks of prior vehicular charge assemblies.

SUMMARY OF THE INVENTION

It is a first object of the present invention to provide a vehicle charge assembly which overcomes some or all of the drawbacks of prior vehicle charge assemblies.

It is a second object of the present invention to provide a vehicle charge assembly which overcomes some or all of the drawbacks of prior vehicle charge assemblies and which selectively stores and provides electrical charge to a vehicle starter.

It is a third object of the present invention to provide a vehicle charge assembly which overcomes some or all of the drawbacks of prior vehicle charge assemblies, which selectively stores and provides electrical charge to a vehicle starter in order to selectively start the vehicle engine, and which selectively increases the amount of torque provided by the vehicle's transmission.

According to a first aspect of the present invention a vehicle charge assembly is provided. The vehicle charge assembly is adapted for use in combination with a vehicle of the type having an internal combustion engine and a starter. The vehicle charge assembly includes a capacitor assembly which is coupled to the starter; and a power inverter which is coupled to the capacitor assembly and to the starter.

According to a second aspect of the present invention, a method is provided to increase the torque produced by a power transmission assembly. The method includes the steps of providing a capacitor assembly; charging the capacitor assembly; providing a motor; coupling the motor to the power transmission assembly; and communicating the charge from the capacitor to the motor, effective to cause the motor to produce torque, thereby increasing the torque produced by the power transmission assembly.

These and other features, aspects, and advantages of the present invention will become apparent from a reading of the following detailed description of the preferred embodiment of the present invention and by reference to the attached drawings.

DETAILED DESCRIPTION OF THE PREFERRED EMBODIMENT OF THE INVENTION

Figure 1:
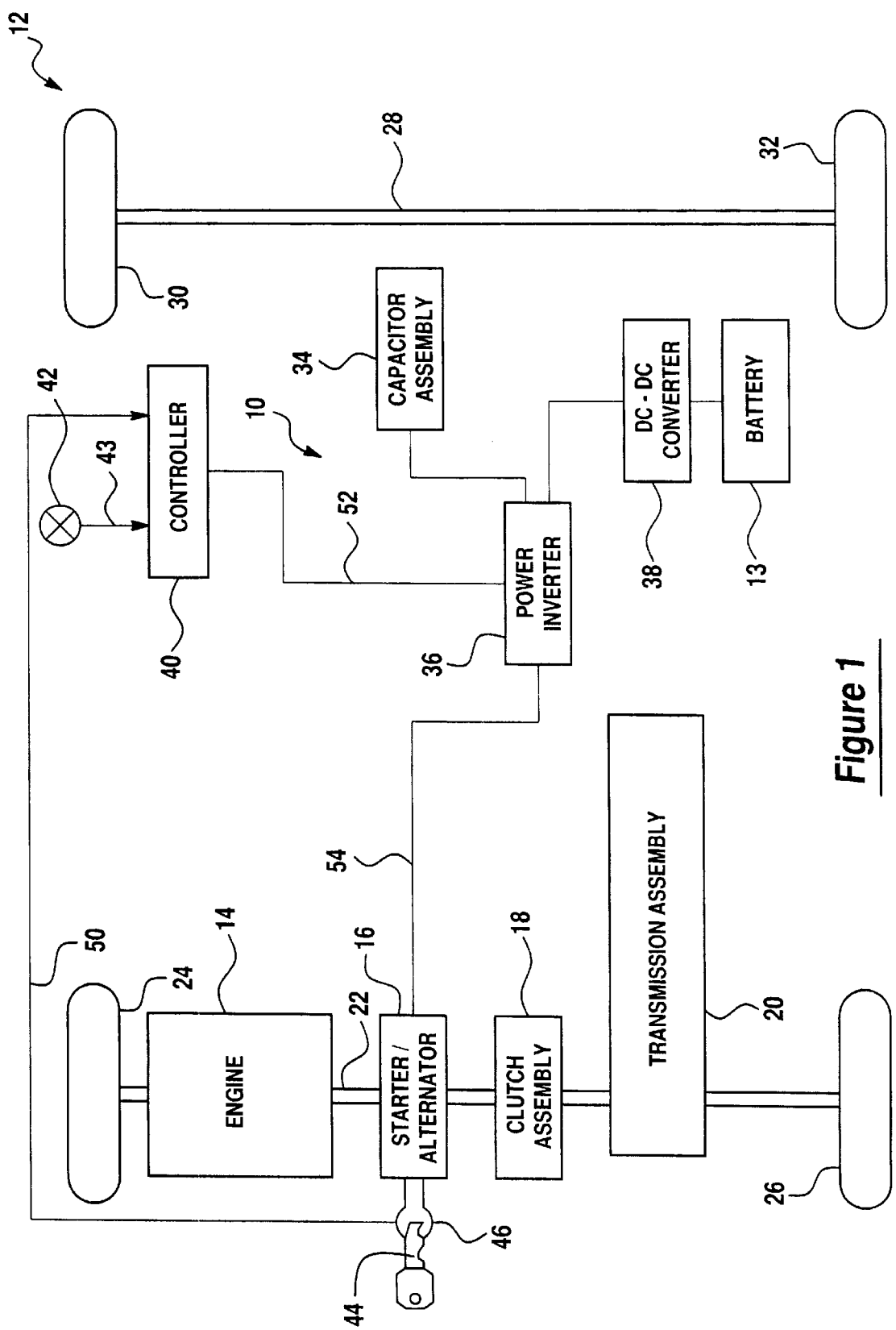
FIG. 1 is block diagram of a vehicle charge assembly which is made in accordance with the teachings of the preferred embodiment of the invention and which is incorporated within a vehicle.

Referring now to FIG. 1, there is shown a vehicle charge assembly 10 which is deployed within a vehicle 12 which for example and without limitation is of the type which includes and/or comprises an internal combustion engine 14 which is coupled to starter and alternator motor assembly 16. Vehicle 12 further includes a battery 13 which may be of the twelve or thirty-six volt type, and a power transmission assembly 20 which produces torque. Vehicle 12 further includes an axle 22 which is coupled to the power transmission assembly 20, which is selectively driven by the power transmission assembly 20 (i.e., by the torque produced by the power transmission assembly 20) and which includes a pair of wheels 24, 26. Further, vehicle 12 includes a second axle 28 having a pair of wheels 30, 32. Axles 22 and 28 cooperatively allow wheels 24, 26, so, and 32 to be selectively rotated, effective to allow the vehicle 12 to be driven.

Vehicle charge assembly 10 includes a clutch assembly 18 which is coupled to the transmission assembly 20, a capacitor assembly 34 which, in one non-limiting embodiment of the invention, comprises a plurality of substantially identical capacitors which are connected in a electrical series configuration. In the preferred embodiment, each of the capacitors comprises an ultra capacitor. In one non-limiting embodiment, each of the capacitors is substantially identical having a capacitance value of about one farad and having a voltage rating of about 100 volts. It should be appreciated that the use of ultra capacitors in the preferred embodiment provides for reduced volume and weight relative to conventional capacitors, thereby reducing vehicle weight and the amount of packaging space required to house the capacitors. In this one non-limiting embodiment assembly 34 utilizes about three such capacitors, although other numbers and/or types of capacitors may be utilized. Charge assembly 10 may also include a combination of capacitors and a battery.

Charge assembly 10 further comprises a direct current to direct current converter 38 which is coupled to the battery 13 and to the electrical power inverter 36. Charge assembly 10 also includes a controller 40, operable under stored program control, which is coupled to the power inverter 36 and to the starter/alternator assembly 16. In one non-limiting embodiment, controller 40 may comprise a conventional engine control module. Charge assembly 10 also includes a selectively depressible switch circuit assembly 42 which is coupled to the controller 40 by bus 43 and which selectively causes the controller 40 to increase the amount of torque produced by the transmission assembly 20 in the manner which is more fully delineated below.

In operation, the capacitor assembly 34 initially receives electrical power from the battery 13 through the converter 38 and the inverter 36. When the ignition key 44 is placed within the ignition portion 46 of the starter/alternator assembly 16 and turned, a signal is produced by the assembly 16 and communicated to the controller 40 upon the bus 50. The signal is effective to cause the controller 40 to create and communicate a signal to the power inverter 36 on bus 52, effective to allow the electrical power or electrical charge to be sent to the starter/alternator assembly 16, by use of bus 54, from the electrically charged capacitor assembly 34. The electrical power causes the starter/alternator to become activated, effective to activate or "turn on" the engine 14. The activated engine 14 provides torque to the power transmission assembly 20 in a conventional manner. The starter/alternator 16 is also "turned" or operated by the activated engine 14 and the controller 40 sends a signal to the power inverter 36, effective to interrupt the communication of electrical charge from assembly 34 to the starter/alternator 16 while allowing the activated starter/alternator 16 to generate and communicate electrical power to the assembly 34 and to the battery 13, effective to increase the electrical charge within the assembly 34 and the battery 13.

In the preferred embodiment, when the vehicle is placed into a parked position or state or is "shut off", controller 40 communicates a signal to power inverter 36 on bus 52 effective to cause the stored charge within assembly 34 to be controllably discharged. In this manner, the relatively high voltages held within the capacitors are eliminated when the vehicle is "turned off", thereby preventing any undesirable discharge of voltage into the electrical system of vehicle 12 and protecting the electrical components of vehicle 12.

Assembly 10 may be utilized in electric vehicles (i.e., in non-engine containing vehicles) by causing capacitor assembly 34 to supply electrical charge to assembly 16, in the foregoing manner, thereby causing assembly 16 to transfer torque to the power transmission assembly 20 by use of clutch assembly 14 and allowing the vehicle 10 to be driven without the use of engine 14. In this electric vehicle configuration, battery 13 and converter 38 may be removed while allowing assembly 34 to selectively receive electrical charge from a power source external to the vehicle 12.

Should additional torque be needed, within vehicle 12, from the transmission assembly 20, switch 42 is selectively depressed, thereby generating a signal onto bus 43. Upon receipt of the signal, controller 40 generates a signal on bus 52 to the power inverter 36 which is effective to cause the electrical charge from capacitor assembly 34 to be transferred to the starter/alternator 16 by use of bus 54, effective to cause the starter/alternator 16 to become activated or to turn and to selectively engage the clutch assembly 18. The torque produced by the starter/alternator 16 is then transferred to the transmission assembly 20 by use of clutch assembly 18, effective to increase the amount of torque communicated to the transmission assembly 20 (i.e. the torque communicated to the transmission assembly 20, in one non-limiting embodiment, emanates from both the engine 14 and the starter/alternator 16). Alternatively, as earlier delineated, vehicle 12 may be driven without the need for the engine 14 (i.e. the transmission assembly 20 may only be "powered" by the starter/alternator assembly 16 through the clutch assembly 18). A second depression of the switch 42 causes the assembly 16 to disengage from the clutch assembly 18.

It should be appreciated that capacitor assembly 34 is relatively compact and relatively lightweight, thereby reducing the amount of storage space otherwise required by traditional battery assemblies and improving overall vehicle fuel economy. Further, the capacitor assembly 34 provides an easily modeled charging function which allows the overall performance of the vehicle 12 to be well predicted and the performance of assembly 34 is relatively temperature insensitive.

It is to be understood that the invention is not to be limited to the exact construction and method which has been illustrated and described above, but that various changes may be made without departing from the spirit and the scope of the inventions as defined in the following claims.

What is claimed is:

1. A charge assembly for use with a vehicle of the type having an engine and a starter, said charge assembly comprising:
   a capacitor assembly having an electrical charge which is controllably discharged from said capacitor assembly when said engine is stopped;
   a power inverter which is coupled to said capacitor assembly and to said starter; and
   a controller which is coupled to said power inverter and which generates a first signal effective to allow said electrical charge to be communicated to said starter through said power inverter and a second signal which is effective to allow electrical charge to be communicated to said capacitor assembly through said power inverter.

2. The charge assembly of claim 1 wherein said capacitor assembly comprises a first and a second capacitor which are coupled in an electrical series configuration.

3. The charge assembly of claim 2 wherein said first and second capacitor each comprises an ultra capacitor.

4. The charge assembly of claim 1 wherein said vehicle includes a clutch assembly and a power transmission assembly, said controller selectively generating a third signal which is effective to couple said clutch assembly to said starter and to said power transmission assembly.

5. The charge assembly of claim 1 wherein said controller is further effective to communicate a fourth signal to said power inverter effective to cause said capacitor assembly to become discharged when said vehicle is in a parked position.

6. A method for increasing the torque produced by a transmission, said method comprising the steps of:
   providing a capacitor assembly;
   providing a torque producing motor;
   activating said torque producing motor by use of said capacitor assembly;
   providing a selectively depressible switch which, when selectively depressed, couples said torque producing motor to said transmission, thereby increasing the amount of torque produced by said transmission;
   providing a clutch assembly; and
   coupling said clutch assembly to said torque producing motor and to said transmission.

7. The method of claim 6 where said torque producing motor comprises a starter.

8. The method of claim 7 further comprising the steps of:

providing a selectively depressible switch; and coupling said torque producing motor to said transmission upon the selective depression of said switch.

9. The method of claim 8 further comprising the steps of:

providing a battery; and coupling said battery to said capacitor assembly by use of a direct current to direct current converter.

10. The method of claim 9 wherein said battery is of the twelve-volt type.

11. The method of claim 9 wherein said battery is of the thirty-six volt type.

12. The method of claim 6 further comprising the step of:

generating electrical charge by said torque producing motor; and communicating said electrical charge to said capacitor assembly.

* * * * *